Oct. 22, 1929.  A. D. KIRKLAND  1,732,896
COCOA ROASTER
Filed Sept. 10, 1928   3 Sheets-Sheet 3
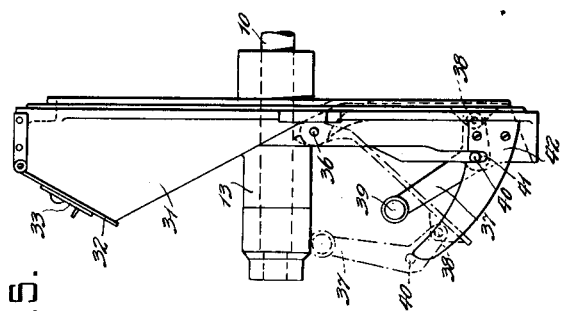
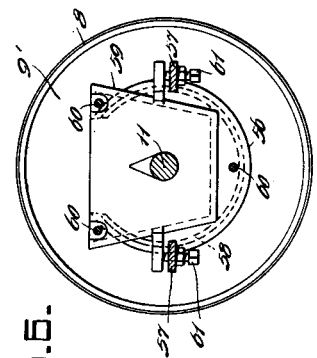
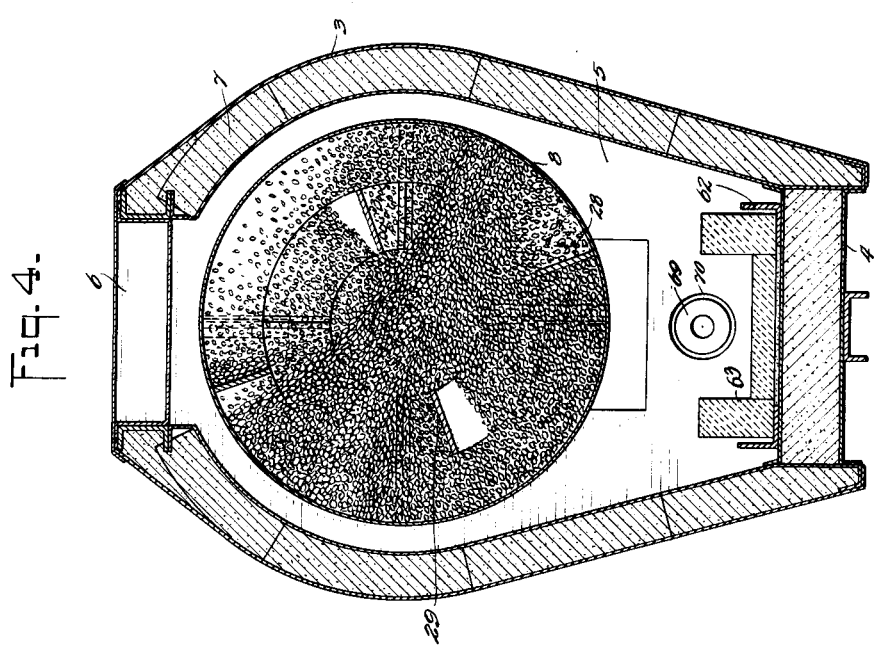
INVENTOR
Archibald D. Kirkland
BY J. S. Wooster
ATTORNEY Patented Oct. 22, 1929

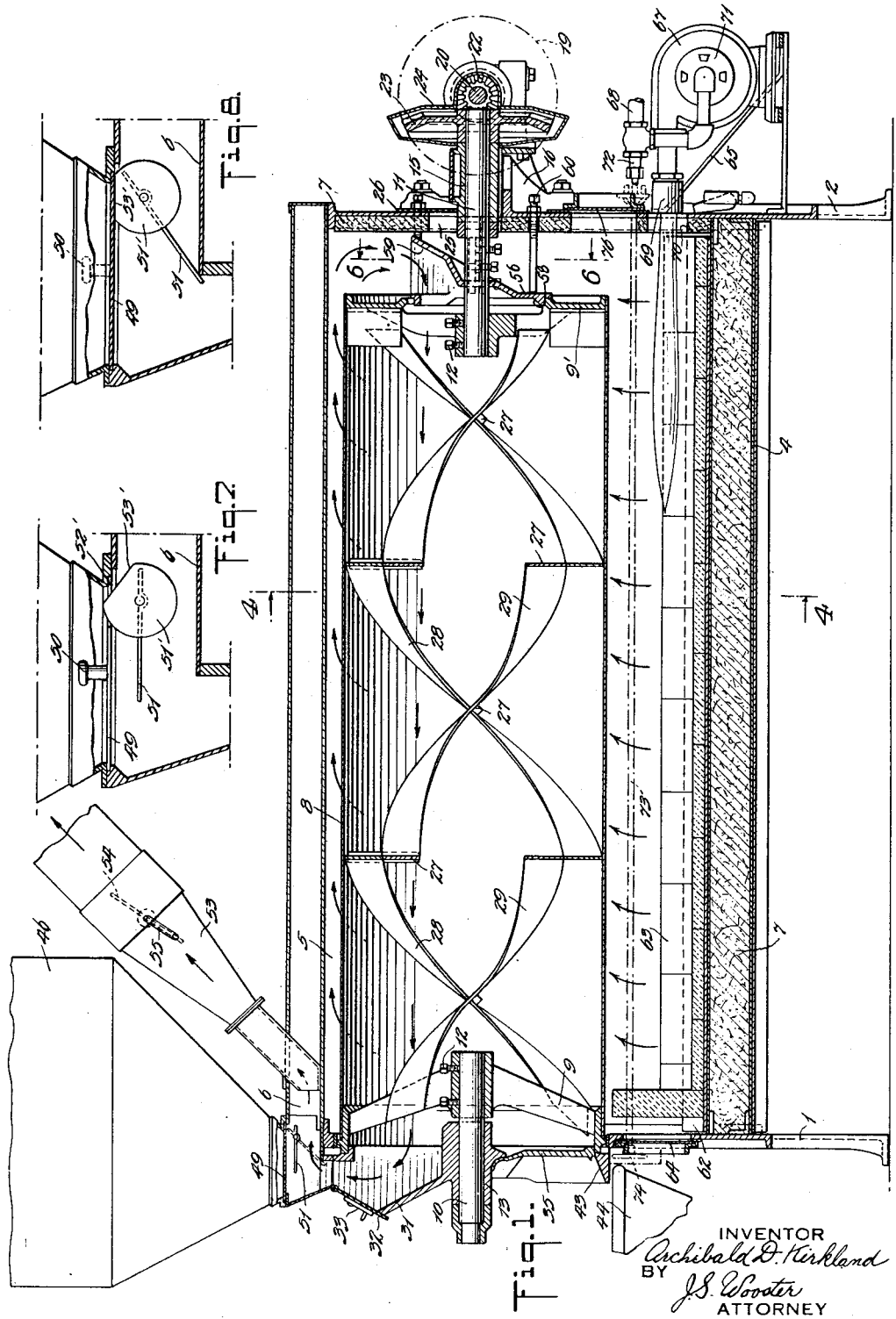

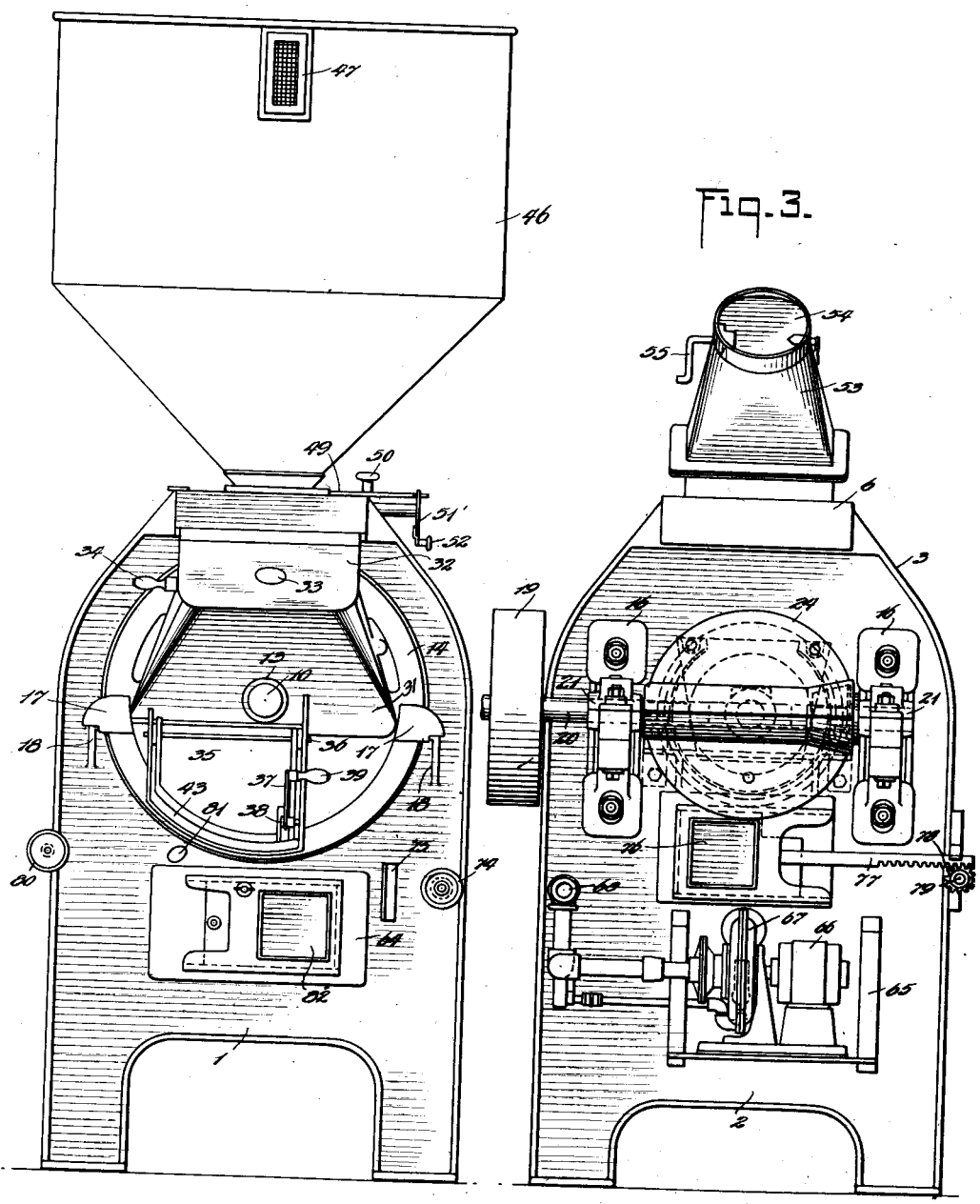

1,732,896

UNITED STATES PATENT OFFICE

ARCHIBALD D. KIRKLAND, OF NEW YORK, N. Y., ASSIGNOR TO JABEZ BURNS & SONS, INC., OF NEW YORK, N. Y., A CORPORATION OF NEW YORK

COCOA ROASTER

Application filed September 10, 1928. Serial No. 304,943.

This invention relates to apparatus for roasting cocoa beans and the like, and has for its object to provide a compact and unitary apparatus for roasting the beans uniformly under controlled conditions to develop their full delicate flavor, to carry off waste products of the roast, to reduce the time of roasting, and to minimize the labor required.

Cocoa beans have usually been roasted in cylindrical or ball-shaped containers, constructed without perforations to prevent the material from being lost. Heat has been supplied by burning coal or gas beneath the container and roasting accomplished by the heat conducted through the sheet iron shell. This practice is objectionable because it takes too long to roast the beans unless the shell of the container is heated to a very high temperature, and if the shell is too highly heated the outer surfaces of the beans are burned or carbonized where they come in contact with the shell. It is therefore impossible, with this type of apparatus, to roast the beans uniformly at a speed suitable for commercial use, or to maintain a definite temperature within the container.

Ball-type machines have also been constructed to roast cocoa beans by means of air which is first heated by passage through a coal or gas furnace separate and apart from the roasting machine. The heated air and products of combustion have been admitted to a chamber surrounding the ball-shaped container and then into the interior of the ball and through the mass of beans. Machines of this type, however, have made little headway because of their inconvenience, the increased number of operators required, the added floor space occupied by the separate furnace, and becasue of the economic waste in heat lost between the furnace and the roaster.

The present invention provides a simple and efficient roaster which overcomes the difficulties outlined above, and is not only much easier and cheaper to operate than previous devices, but also results in a distinct superiority in the quality of the roasted beans and in the purity and delicacy of their flavor. The apparatus includes a heating chamber containing a rotatable roasting cylinder which is small in diameter in relation to its length, and is provided with ventilating openings at both ends. The interior of the cylinder is provided with mixing flanges which cause the beans to move back and forth as the cylinder is rotated. Heating is preferably accomplished by means of a gas flame of exceedingly high temperature so situated in the chamber below the cylinder that the direct heat from the flame does not impinge upon the cylinder. The heated air circulates around the cylinder, then enters through the opening at one end of the cylinder, and after giving up its heat to the beans is withdrawn at the other end of the cylinder by means of an exhaust fan.

Since the cross-section of the roasting cylinder is relatively small, the mixing flanges in moving the material to and fro cause the heated air to circulate through all portions of the mass, and permit the beans to absorb the heat rapidly and uniformly. Air at room temperature enters the machine through openings in the front and back of the heating chamber, and is heated to any desired temperature by the gas flame. Adjustable dampers are provided to regulate the amount of air admitted to the heating chamber, and means are also provided for regulating the gas and air producing the flame, making it possible to obtain a much more accurate regulation of temperature than heretofore. The beans may be brought up to a high temperature in a very short time without danger of scorching, and after the desired temperature has been reached it can be maintained by admitting cooler air in measured quantities for mixing with the heated air.

The circulation of clean hot air through every portion of the cylinder insures a uniform application of heat and also carries off steam, smoke, dust, light hulls and other waste products of the roast. The removal of this foreign matter in the early stages of roasting prevents it from being cooked and results in obtaining a clean, bright product. A single operator can easily run one or more machines without special knowledge. The usual practice has been to roast a charge of 550 or 600 pounds of cocoa beans in a cylinder, the actual roasting time heretofore varying from fifty minutes to an hour and a quarter, depending upon the quality of the beans, the degree of roasting, etc. Batches of the same size have been roasted in from thirty-five to fifty minutes in the roaster of the present invention, with a great improvement both in the appearance and quality of the product.

The invention will be described in connection with the accompanying drawings, in which:

Fig. 1 is a longitudinal section of a cocoa roaster embodying the invention;

Fig. 2 is a front end view showing the filling, discharging and controlling mechanisms;

Fig. 3 is a rear end view showing the actuating mechanism and the gas burner;

Fig. 4 is a transverse section on a larger scale, taken on the line 4—4 of Fig. 1;

Fig. 5 is a detail of the discharge gate and operating device therefor;

Fig. 6 is a transverse section taken on the line 6—6 of Fig. 1;

Fig. 7 is a fragmentary sectional view showing means permitting the damper in the smoke pipe to be opened only when the damper in the feed gate is closed; and Fig. 8 is a similar view showing the damper in closed position with the feed gate open.

The preferred construction shown in the drawings includes a front plate 1 and a back plate 2 connected by double side walls 3 and bottom walls 4 which enclose the interior heating chamber 5. The top of the heating chamber 5 is enclosed by a smoke pipe 6, the purpose of which is hereinafter described. The end plates, walls and smoke pipe may be made of cast or sheet iron and are connected together by means of the usual angles or channels best shown in Figs. 1 and 4. The walls are insulated by a filling 7 of asbestos to prevent loss of heat.

The elongated roasting cylinder 8 consists of a sheet iron shell mounted on a front end spider 9 and an annular back head 9', and is comparatively small in diameter in relation to its length, as shown in Fig. 1. The cylinder 8 is supported on end shafts 10 and 11 which are keyed to the spider 9 and back head 9', respectively, by means of set screws 12. The head 9' can have one large inlet or be perforated to give the desired inlet area. The outer end of the shaft 10 is rotatably mounted in a bushing 13 formed in the front head 14 on the front plate 1. The outer end of the shaft 11 is rotatably mounted in a bushing 15 which is supported on brackets 16 on the back plate 2. The front head 14 is supported by a pair of integral ears 17 resting on lugs 18 which project from the front plate 1. The bushing 13, in which the shaft 10 rotates, is disposed centrally in the front head 14. The bushing 15, in which the shaft 11 rotates, is in axial alignment with the bushing 13.

The roasting cylinder 8 is rotated by means of a pulley 19, driven by any suitable source of power, and carried by a shaft 20 which is journaled in split bearings 21 formed in the brackets 16. The shaft 20 carriers a pinion 22 which meshes with a gear 23 carried by the cylinder shaft 11. The shaft 20, pinion 22 and gear 23 are substantially covered by a guard casing 24. The opening 25 in the back plate 2 is closed by a plate 26 through which the bushing 15 and shaft 11 project.

A plurality of lugs 27 are mounted at intervals inside the cylinder 8 and support spirally disposed mixing flanges 28 and 29. The spiral flanges 28 lie against and project from the inner surface of the cylinder 8 and convey the material toward the outlet at the left of Fig. 1 when the cylinder is rotated in a clockwise direction. The spiral flanges 29 are of opposite pitch from the flanges 28 and move the material in the opposite direction. The flanges 29 are spaced a definite distance from the wall of the cylinder. Hence, the flanges 28 and 29 together mix the material thoroughly and still permit the cylinder to be emptied quickly at the front end when desired.

The upper portion of the front head 14 is inclined outwardly and upwardly to form a feed chute 31. The upper end of the chute 31 is normally closed by a door 32 hinged to the front head 14 and provided with a peep hole which is normally closed by a cover 33. The door 32 is actuated by a handle 34, and may be used to examine or sample the contents of the cylinder. The roasting cylinder is emptied by means of a discharge gate 35 which is hinged at 36 to front head 14 and normally closes an opening therein adjacent the lower forward end of the cylinder. A lever or handle 37 is pivoted to the gate 35 at 38, and is provided at its outer end with a hand grip 39. A transverse projection 40 on the handle 37 normally engages a slot 41 in a bracket 42 which is mounted on the front head 14. The projection 40 may be hooked over the outer end of the bracket 42 to hold the gate 35 in the open position shown in dotted lines in Fig. 5. The bracket 42 has a smoothly curved upper surface which serves to guide the projection 40 back into the slot 41 when the handle 37 is released to close the gate. The lower portion of the front head 14 is inclined outwardly and downwardly adjacent the lower edge of the gate 35 to form a chute 43 which discharges the material into any suitable receptacle 44.

A feed hopper 46 is mounted at the front end of the machine to admit cocoa beans to the open end of the roasting cylinder at the left of Fig. 1. A sight glass 47 at the upper end of the hopper enables the operator to observe the level of the beans in the hopper. The flow of beans from the hopper is controlled by a sliding feed gate 49 actuated by a handle 50. A pivoted damper 51 controlled by a handle 52 is also located conveniently at the front end of the machine to control the flow of heated air from the cylinder 8 to the smoke pipe 6. A gate stop 51' is rigidly fastened to the shaft which operates the damper 51, as shown in Figs. 2, 7 and 8, to prevent the damper from being opened except when the feed gate 49 is completely closed. When the feed gate 49 is closed, as shown in Fig. 7, a slot 52' in the gate registers with the gate stop 51' and permits it to rotate therein when the handle 52 is actuated, permitting the damper 51 to be opened. When the gate 49 is open, as shown in Fig. 8, the slot 52' lies beyond the gate stop 51' and the flat edge 53' of the stop strikes the under face of the gate and prevents the damper 51 from being opened. Hence the feed gate cannot be opened until the damper is moved to the closed position shown in Fig. 8. A draft pipe 53 at the front end of the machine has one end connected to the smoke pipe 6 and the other end connected to a suitable exhaust fan, not shown, to draw the smoke, light hulls and other waste products of the roast from the smoke pipe to the outer atmosphere. The suction in the draft pipe 53 is controlled by a damper 54 actuated by a handle 55 which is easily accessible to the operator standing at the front of the machine. The draft pipe 53 may be connected to any part of the smoke pipe 6, as desired.

At the rear end of the heating chamber 5 a stationary disk 56 is mounted on brackets 57 which are clamped to the back plate 2. The annular front end 58 of the disk 56 fits the circular opening in the back head 9' of the cylinder. The rear face 59 of the disk 56 slopes upwardly and outwardly, as shown in Figs. 1 and 6, providing a flared opening which extends slightly above the annular portion 58 and thus permits heated air to enter freely and circulate through the cylinder but prevents the cocoa beans from falling out. Bolts 60 permit shaftwise adjustment of the disk 56, and bolts 61 permit vertical adjustment thereof.

At the base of the heating chamber 5, and running lengthwise beneath the center of the cylinder 8, is a burner trough 62, shown in Figs. 1 and 4. The base, sides, and front end of the trough 62 are lined with fire brick 63. Access to the burner trough is gained by removing a handhole cover 64 conveniently located adjacent the bottom of the front plate 1. Heating is accomplished by means of a motor-driven gas burner arranged to mix the gas with air under any desired pressure. The burner, as shown in Figs. 1 and 3, is supported by brackets 65 mounted on the back plate 2, and includes a motor 66, air and gas pump 67, gas supply pipe 68, and a burner nozzle 69 adjacent an opening 70 in the back plate 2. The burner throws an intensely hot flame into the chamber 5 without impinging directly upon the cylinder 8. The amount of air admitted to the burner is controlled by an adjustable shutter 71 provided with holes which communicate with inlet ports in the pump 67. The flow of gas is controlled by a valve 72 which is connected by means of a rod 73 to a hand wheel 74 on the front plate 1 protected by a guard 75.

By the use of gas mixed with air under pressure, a short, very hot flame is projected into the chamber 5 without impinging directly on the roasting cylinder 8. The heated air in the chamber 5 completely envelops the cylinder 8 and is drawn gently through the flared opening in the disk 56, thence through the cylinder 8 from back to front where it gives up its heat to the cocoa beans and removes the smoke, dust, light hulls, etc., and is then drawn through the draft pipe 53 and discharged into the outer atmosphere. The suction which causes the circulation of the hot air may be controlled by adjusting the damper 54 in the draft pipe 53. The shell of the roasting cylinder 8 also receives sufficient heat from the gas flame to bring it up to approximately the same temperature as the cocoa beans so that it aids the roasting without burning the surfaces of the beans where they come in contact with the shell. The spiral mixing flanges 28 and 29 agitate and mix the cocoa beans thoroughly as the cylinder 8 is rotated, permitting the hot air to circulate equally through all parts of the mass and to roast all portions of the beans uniformly.

Since the amount of air required in the gas burner varies with the kind of gas employed, the proper adjustment can best be determined by actual test. The operator may inspect the flame through a peep hole 81 at the front end of the machine. During a roast the draft should be regulated, by adjustment of dampers 51 and 54, so that it is just strong enough to prevent the escape of steam and smoke into the room. Any greater suction wastes heat. During a roast the temperature of the air surrounding the roasting cylinder, and entering the rear end of the cylinder, may be controlled by admitting air at room temperature to the heating chamber 5. For this purpose a sliding door 76 is provided in the back plate 2. The door 76 is operated by a rack 77 actuated by a pinion 78 mounted on a rod 79 which runs lengthwise of the machine and terminates in a hand wheel 80 on the front plate 1. A door 82 in the cover 64 at the front end of the machine may likewise be opened to admit fresh air to the chamber 5. By adjusting the doors 76 and 82, and by regulating the gas and air producing the gas flame, a much more accurate regulation of temperature can be obtained than has been possible heretofore.

The entire roasting operation may easily be performed by a single operator who can control a single roaster or a battery of several roasters. After the machine is started all adjusting, observing and sampling may be done quickly at the front end of the machine. After the roasting operation is completed, the gas can be turned out, the air regulator adjusted and air at room temperature admitted to the interior of the cylinder to remove the highly heated air and thus prevent over-roasting of the cocoa beans. The beans can thus be partially or completely cooled, the former being generally preferable, and they can then be discharged from the roaster into the usual cooler box with its connected exhaust fan for complete cooling.

Various changes may, of course, be made in details of construction herein shown and described without departing from the scope and spirit of the invention as defined in the appended claims.

The invention claimed is:

1. In a roaster for cocoa beans or the like, an enclosed chamber, an elongated rotatable cylinder in said chamber to hold the material to be roasted, an opening in the front end of said cylinder shut off from said chamber to permit the cylinder to be filled, an aperture in the rear end of said cylinder, a stationary member fitting into said aperture and having an opening at the top to admit air and prevent the material in the cylinder from falling out, means for admitting fresh air to said chamber, means for heating the air in said chamber, and means for circulating the heated air around the outside of said cylinder, then through the aperture in the rear end of the cylinder, through the material in the cylinder and out through the opening in the front end of the cylinder.

2. In a roaster for cocoa beans or the like, an enclosed chamber, an elongated rotatable cylinder in said chamber to hold the material to be roasted, an opening in the front end of said cylinder shut off from said chamber to permit the cylinder to be filled, an aperture in the rear end of said cylinder, a stationary member fitting into said aperture and having an opening at the top to admit air and prevent the material in the cylinder from falling out, means for admitting fresh air to said chamber, means for heating the air in said chamber, and adjustable means for creating a suction at the opening in the front end of the cylinder to draw the heated air from around the outside of said cylinder through the aperture in the rear end thereof and thence through the cylinder and out through the opening in the front end thereof.

3. In a roaster for cocoa beans or the like, a container to hold the material to be roasted, a sliding gate for admitting the material to said container, means for circulating heated gases through said container, an outlet for withdrawing the gases from said container, an ajustable damper for controlling the flow of gases through said outlet, and means associated with said damper and engageable with said gate in certain positions thereof to prevent said damper from being opened.

4. In a roaster for cocoa beans or the like, a container to hold the material to be roasted, a sliding gate for admitting the material to said container, means for circulating heated gases through said container, an outlet for withdrawing the gases from said container, a movable damper for adjustably controlling the flow of gases through said outlet, a stop member movable with said damper and positioned to strike against said gate when said gate is open to prevent said damper from being opened, and a slot in said gate positioned to register with and receive said stop member when the gate is closed to permit said damper to be opened.

Signed at New York, in the county of New York and State of New York, this 4th day of Sept., A. D. 1928.

ARCHIBALD D. KIRKLAND.